US012699292B2

(12) United States Patent
Park et al.

(10) Patent No.: US 12,699,292 B2
(45) Date of Patent: Aug. 4, 2026

(54) INFRARED MODULATOR, OPTICAL DEVICE INCLUDING THE INFRARED MODULATOR, AND OPTICAL COMPUTING SYSTEM INCLUDING THE OPTICAL DEVICE

(71) Applicant: SAMSUNG ELECTRONICS CO., LTD., Suwon-si (KR)

(72) Inventors: Changyoung Park, Suwon-si (KR); Sanghun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 545 days.

(21) Appl. No.: 18/196,739

(22) Filed: May 12, 2023

(65) Prior Publication Data

US 2024/0176170 A1      May 30, 2024

(30) Foreign Application Priority Data

Nov. 28, 2022    (KR) ........................ 10-2022-0162038

(51) Int. Cl.
   *G02F 1/017*      (2006.01)
   *G02F 1/015*      (2006.01)
(52) U.S. Cl.
   CPC ........ *G02F 1/01708* (2013.01); *G02F 1/0157* (2021.01); *G02F 1/01716* (2013.01)
(58) Field of Classification Search
   CPC .............. G02F 1/01708; G02F 1/0157; G02F 1/01716; G02F 1/025
   USPC ....................................................... 385/1–3
   See application file for complete search history.

(56) References Cited

U.S. PATENT DOCUMENTS

| 5,363,457 | A | 11/1994 | Falt et al. |
| 6,148,017 | A | 11/2000 | Borchert et al. |
| 6,477,283 | B1 | 11/2002 | Shimizu et al. |
| 8,538,206 | B1 | 9/2013 | Fish et al. |
| 9,042,418 | B2 | 5/2015 | Kim et al. |
| 9,871,162 | B2 * | 1/2018 | Solari .............. H10H 20/01335 |

(Continued)

FOREIGN PATENT DOCUMENTS

| EP | 0 708 930 B1 | 1/1998 |
| EP | 0 906 646 B1 | 12/1999 |

(Continued)

OTHER PUBLICATIONS

"Full-Duplex Fiber-Optic RF Subcarrier Transmission Using a Dual-Function Modulator/Photodetector" by Stohr et al, IEEE Transactions on Microwave Theory and Techniques, vol. 47, No. 7, pp. 1338-1341 (Year: 1999).*
"Electroabsorption-modulated laser as optical transmitter and receiver: status and opportunities" by Schrenk et al, IET Optoelectronics, vol. 14, No. 6, pp. 374-385 (Year: 2020).*

(Continued)

*Primary Examiner* — Robert Tavlykaev
(74) *Attorney, Agent, or Firm* — Sughrue Mion, PLLC

(57) ABSTRACT

Provided is an infrared modulator including a silicon substrate, a multiple buffer layer on the silicon substrate, the multiple buffer layer including indium phosphide (InP), a first type semiconductor layer on the multiple buffer layer, the first type semiconductor layer including InP, a light absorption layer on the first type semiconductor layer, the light absorption layer including a quantum well structure including indium gallium arsenic phosphide (InGaAsP), and a second type semiconductor layer on the light absorption layer, the second type semiconductor layer including InP.

16 Claims, 14 Drawing Sheets

(56)                    References Cited

U.S. PATENT DOCUMENTS

| | | | |
|---|---|---|---|
| 11,211,523 B2 | 12/2021 | Nitta | |
| 2005/0068601 A1 | 3/2005 | Kang et al. | |
| 2008/0101425 A1* | 5/2008 | Murata | H01S 5/0265 |
| | | | 359/245 |
| 2015/0277157 A1* | 10/2015 | Jones | G02B 6/12019 |
| | | | 385/2 |
| 2019/0370652 A1* | 12/2019 | Shen | G06N 3/0475 |
| 2021/0020814 A1 | 1/2021 | Koshika et al. | |
| 2021/0242362 A1* | 8/2021 | Park | H10F 30/223 |
| 2022/0102573 A1 | 3/2022 | Park et al. | |
| 2023/0170430 A1 | 6/2023 | Park et al. | |
| 2023/0280532 A1* | 9/2023 | Schrans | G02B 6/421 |
| | | | 385/8 |

FOREIGN PATENT DOCUMENTS

| | | |
|---|---|---|
| EP | 1 069 456 B1 | 4/2005 |
| KR | 10-2005-0031476 A | 4/2005 |
| KR | 10-2023-0081463 A | 6/2023 |

OTHER PUBLICATIONS

"Design of monolithically integrated GeSi electroabsorption modulators and photodetectors on an SOI platform" by Liu et al, vol. 15, No. 2, Optics Express, pp. 623-628 (Year: 2007).*

"Dual-Function Electroabsorption Waveguide ModulatorDetector for Optoelectronic Transceiver Applications" by Welstand et al, IEEE Photonics Technology Letters, vol. 8, No. 11, pp. 1540-1542 (Year: 1996).*

Communication dated Apr. 30, 2026, issued by the Korean Ministry of Intellectual Property in Korean Application No. 10-2022-0162038.

* cited by examiner

INFRARED MODULATOR, OPTICAL DEVICE INCLUDING THE INFRARED MODULATOR, AND OPTICAL COMPUTING SYSTEM INCLUDING THE OPTICAL DEVICE

CROSS-REFERENCE TO RELATED APPLICATION

This application is based on and claims priority under 35 U.S.C. § 119 to Korean Patent Application No. 10-2022-0162038, filed on Nov. 28, 2022, in the Korean Intellectual Property Office, the disclosure of which is incorporated by reference herein in its entirety.

BACKGROUND

1. Field

Example embodiments of the present disclosure relate to infrared modulators and optical devices including the infrared modulators.

2. Description of Related Art

Si-photonics has been used in various ways because of its advantages such as large-capacity information transfer, ultra-high speed processing, minimum transmission loss, energy consumption reduction, etc., and thus, interest in optical computing using Si-photonics has recently increased.

An infrared modulator modulating light in an infrared band may be used in such an optical computing system. Infrared modulators are generally manufactured based on an indium phosphide (InP) substrate. When such a separately manufactured infrared modulator is applied to a silicon substrate-based optical computing structure, an increase in the system volume due to bonding, noise due to connections, manufacturing defects, etc. may occur, and thus, a method of solving such problems is needed.

SUMMARY

One or more example embodiments provide an infrared modulator and an optical device including the infrared modulator.

Additional aspects will be set forth in part in the description which follows and, in part, will be apparent from the description, or may be learned by practice of the presented embodiments of the disclosure.

According to an aspect of an example embodiment, there is provided an infrared modulator including a silicon substrate, a multiple buffer layer on the silicon substrate, the multiple buffer layer including indium phosphide (InP), a first type semiconductor layer on the multiple buffer layer, the first type semiconductor layer including InP, a light absorption layer on the first type semiconductor layer, the light absorption layer including a quantum well structure including indium gallium arsenic phosphide (InGaAsP), and a second type semiconductor layer on the light absorption layer, the second type semiconductor layer including InP.

The multiple buffer layer may include a first layer including germanium (Ge), a second layer on the first layer, the second layer including gallium arsenide (GaAs), a third layer on the second layer, the third layer including a super-lattice structure including pairs of an aluminum arsenide (AlAs) layer and a GaAs layer that are stacked a plurality of times, and a fourth layer on the third layer, the fourth layer including InP.

A thickness of the first layer may be greater than or equal to 0.1 μm and less than or equal to 5 μm.

A thickness of the second layer may be greater than or equal to 0.1 μm and less than or equal to 5 μm.

Each of the AlAs layer and the GaAs layer included in the third layer may have a thickness greater than or equal to 1 nm and less than or equal to 10 nm.

A thickness of the fourth layer may be greater than or equal to 0.5 μm and less than or equal to 20 μm.

The infrared modulator may further include a first cladding layer between the first type semiconductor layer and the light absorption layer, the first cladding layer including indium (In), gallium (Ga), arsenide (As), and phosphide (P), and a bandgap energy of the first cladding layer being greater than a bandgap energy of a quantum barrier layer, and a second cladding layer between the light absorption layer and the second type semiconductor layer, the second cladding layer including In, Ga, As, and P, and a bandgap energy of the second cladding layer being greater than the bandgap energy of the quantum barrier layer.

The quantum well structure may include $In_xGa_yAs_wP_z$, where $x+y=z+w=1$, $0.4 \leq x \leq 0.6$, and $0.5 \leq z \leq 1.0$, the quantum barrier layer may include $In_xGa_yAs_wP_z$, where $x+y=z+w=1$, $0.5 \leq x \leq 0.7$, and $0.5 \leq z \leq 0.8$, and each of the first cladding layer and the second cladding layer may include $In_xGa_yAs_w P_z$, where $x+y=z+w=1$, $0.65 \leq x \leq 0.85$, and $0.4 \leq z \leq 0.6$.

The light absorption layer may be configured to transmit or absorb light having a wavelength of 1,550 nm based on a voltage applied between the first type semiconductor layer and the second type semiconductor layer.

According to another aspect of an example embodiment, there is provided an optical device including a silicon substrate, an infrared modulator on the silicon substrate, and a photodetector on the silicon substrate and electrically connected to the infrared modulator, wherein the infrared modulator includes a multiple buffer layer including indium phosphide (InP), a first type semiconductor layer on the multiple buffer layer and including InP, a light absorption layer on the first type semiconductor layer and having a quantum well structure including indium gallium arsenic phosphide (InGaAsP), and a second type semiconductor layer on the light absorption layer and including InP.

The photodetector may include the multiple buffer layer of the infrared modulator.

The photodetector may include a second light absorption layer, a material and a structure of the second light absorption layer being the same as a material and a structure of the light absorption layer of the infrared modulator.

The second light absorption layer of the photodetector may include InGaAs.

The optical device may further include an amplifier on the silicon substrate, the amplifier being configured to amplify light transmitted through the infrared modulator.

The optical device may further include an optical waveguide on the silicon substrate, the optical waveguide being configured to branch and guide an incident light to the photodetector and the infrared modulator.

According to yet another aspect of an example embodiment, there is provided an optical computing system including a light source, an optical device configured to output a decision signal based on a type of a light input from the light source, and a processor configured to adjust an input signal to the optical device and process an output from the optical device, wherein the optical device includes a silicon substrate, an infrared modulator on the silicon substrate, and a photodetector on the silicon substrate, the photodetector being electrically connected to the infrared modulator, and wherein the infrared modulator includes a multiple buffer layer including indium phosphide (InP), a first type semiconductor layer on the multiple buffer layer, the first type semiconductor layer including InP, a light absorption layer on the first type semiconductor layer, the light absorption layer including a quantum well structure including indium gallium arsenic phosphide (InGaAsP), and a second type semiconductor layer on the light absorption layer, the second type semiconductor layer including InP.

The photodetector may include the multiple buffer layer of the infrared modulator.

The optical computing system may further include at least one optical circuit on the silicon substrate and optically connected to an input terminal of the optical device or an output terminal of the optical device.

The multiple buffer layer may include a first layer including germanium (Ge), a second layer on the first layer, the second layer including gallium arsenide (GaAs), a third layer on the second layer, the third layer including a super-lattice structure including pairs of an aluminum arsenide (AlAs) layer and a GaAs layer that are stacked a plurality of times, and a fourth layer on the third layer, the fourth layer including InP.

The optical computing system may further include a first cladding layer between the first type semiconductor layer and the light absorption layer, the first cladding layer including indium (In), gallium (Ga), arsenide (As), and phosphide (P), and a bandgap energy of the first cladding layer being greater than a bandgap energy of a quantum barrier layer, and a second cladding layer between the light absorption layer and the second type semiconductor layer, the second cladding layer including In, Ga, As, and P, and a bandgap energy of the second cladding layer being greater than the bandgap energy of the quantum barrier layer.

BRIEF DESCRIPTION OF THE DRAWINGS

The above and other aspects, features, and advantages of certain example embodiments of the disclosure will be more apparent from the following description taken in conjunction with the accompanying drawings, in which.

DETAILED DESCRIPTION

Figure 1:
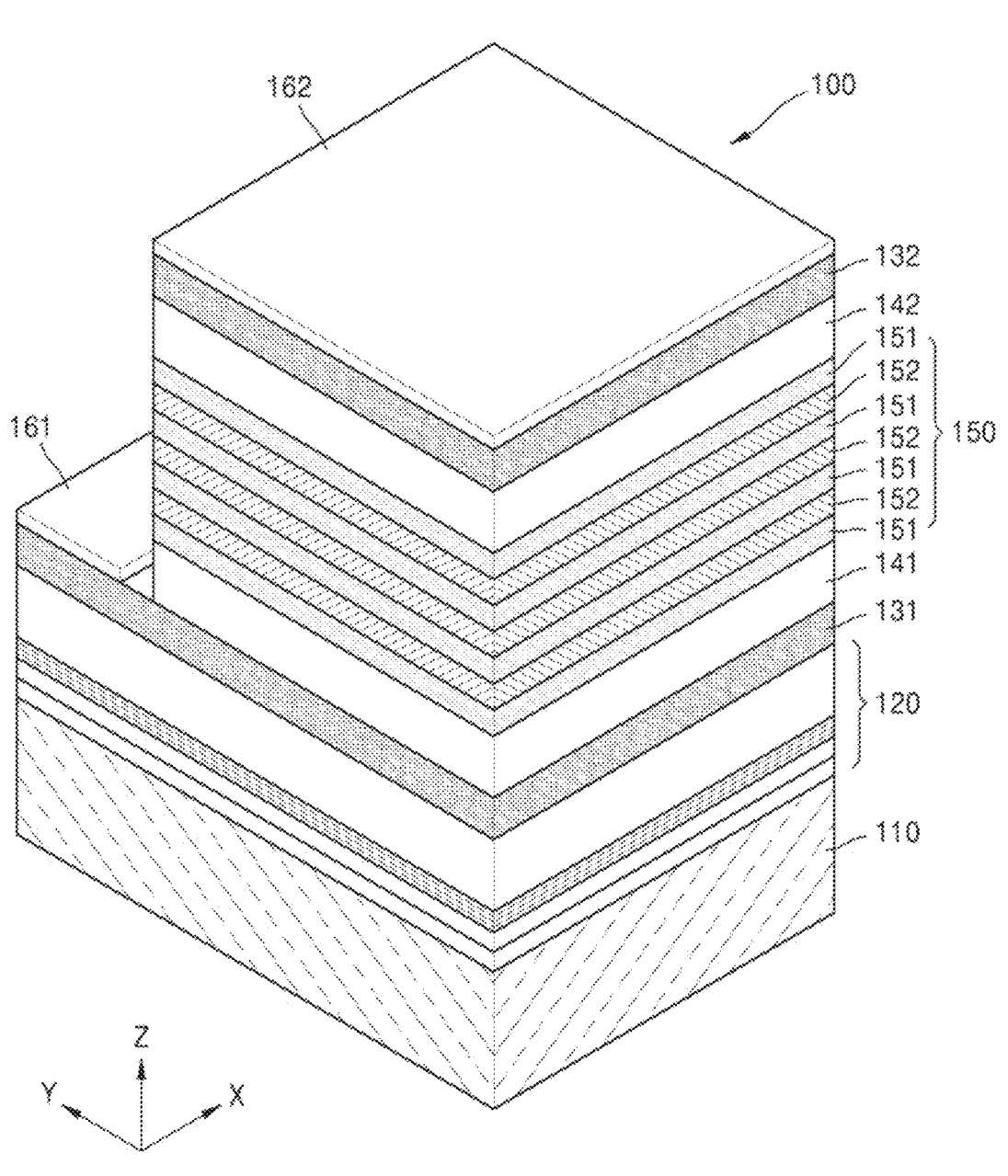
FIG. 1 is a perspective view showing an infrared modulator according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereafter, the disclosure will be described more fully with reference to the accompanying drawings. The example embodiments of the disclosure are capable of various modifications and may be embodied in many different forms. In the drawings, like reference numerals refer to like elements, and the size of each component may be exaggerated for clarity and convenience of explanation.

Hereinafter, when an element or layer is referred to as being "on" or "above" another element or layer, the element or layer may be directly on another element or layer or intervening elements or layers.

Although the terms "first", "second", etc. may be used herein to describe various elements, but these terms are only used to distinguish one element from another. These terms do not limit the difference in materials or structures of the constituent elements.

In the following descriptions, the singular forms include the plural forms unless the context clearly indicates otherwise. When a part "comprises" or "includes" an element in the specification, unless otherwise defined, it is not excluding other elements but may further include other elements.

Also, in the specification, the term "units" or "modules" denote units or modules that process at least one function or operation, and may be realized by hardware, software, or a combination of hardware and software.

The term "above" and similar directional terms may be applied to both singular and plural.

Operations of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

Figure 2:
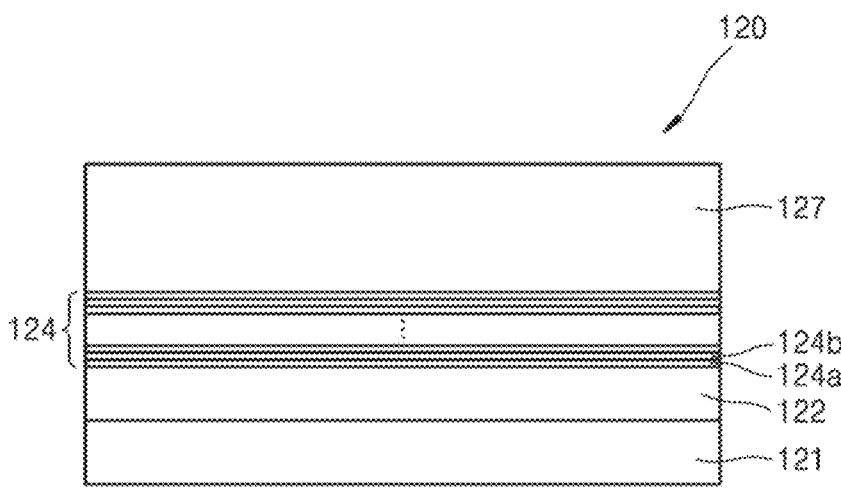
FIG. 2 is a cross-sectional view showing a detailed structure of a multiple buffer layer included in the infrared modulator of FIG. 1.

FIG. 1 is a perspective view showing an infrared modulator according to an example embodiment, and FIG. 2 is a cross-sectional view showing a detailed structure of a multiple buffer layer included in the infrared modulator of FIG. 1.

An infrared modulator 100 includes a silicon substrate 110, a first type semiconductor layer 131 formed on the silicon substrate 110, a light absorption layer 150 and a second type semiconductor layer 132. A multiple buffer layer 120 may be disposed between the silicon substrate 110 and the first type semiconductor layer 131. A first cladding layer 141 may be disposed between the first type semiconductor layer 131 and the light absorption layer 150, and a second cladding layer 142 may be disposed between the light absorption layer 150 and the second type semiconductor layer 132. Each of the first and second cladding layers 141 and 142 may also be referred to as a separated confinement heterostructure (SCH) layer. A first type contact layer 161 may be formed in a partial region on the first type semiconductor layer 131, and a second type contact layer 162 may be formed on the second type semiconductor layer 132. The first type contact layer 161 and the second type contact layer 162 may be connected to electrode pads, respectively, and a voltage for supplying current to the light absorption layer 150 may be applied thereon. A first type may be a p type and a second type may be an n type, but embodiments are not limited thereto.

The infrared modulator 100 may modulate light in an infrared wavelength band. According to a voltage applied to the infrared modulator 100, light of a specific wavelength band may be transmitted through the light absorption layer 150 or absorbed by the light absorption layer 150. The light absorption layer 150 of the infrared modulator 100 of the example embodiment includes a quantum well structure including indium gallium arsenic phosphide (InGaAsP), and may on/off modulate light in a wavelength band of about 1550 nm. Because of a difference in the lattice constant between the silicon substrate 110 and the light absorption layer 150, the light absorption layer 150 is very difficult to grow as a high-quality thin film on the silicon substrate 110 and is generally grown and formed on an InP substrate.

In the example embodiment, a light absorption structure having a relatively high quality thin film state may be formed on the multiple buffer layer 120, by forming the multiple buffer layer 120 on the silicon substrate 110.

A detailed configuration of the infrared modulator 100 is described.

The silicon substrate 110 may include a tilted silicon layer having a crystal growth direction that is off-axis in a vertical direction. For example, an angle formed between the crystal growth direction of the silicon substrate 110 and the vertical direction may be in the range of 1° to 10°.

Referring to FIG. 2, the multiple buffer layer 120 may include a first layer 121 including germanium (Ge), a second layer 122 formed on the first layer 121 and including gallium arsenide (GaAs), a third layer 124 formed on the second layer 122 and including a superlattice structure in which a pair of an aluminum arsenide (AlAs) layer 124a and a GaAs layer 124b is repeatedly stacked a plurality of times, and a fourth layer 127 formed on the third layer 124 and including InP.

Similar to the silicon substrate 110, Ge included in the first layer 121 may have the tilted crystal growth direction. The first layer 121 is not limited to including Ge, and may include, for example, GaP or aluminum phosphide (AlP). The first layer 121 may be formed by, for example, depositing at least one of Ge, GaP, or AlP on the upper surface of the silicon substrate 110 by a metal organic chemical vapor deposition (MOCVD). The thickness of the first layer 121 may be, for example, greater than or equal to 0.1 μm and less than or equal to 5 μm, but is not limited thereto.

The second layer 122 is not limited to including GaAs, and may include, for example, AlAs. The second layer 122 may be formed by depositing, for example, at least one of GaAs and AlAs on the upper surface of the first layer 121 by, for example, the MOCVD.

The superlattice structure of the third layer 124 is a structure in which two or more types of material layers each having a thickness less than or equal to several nm are alternately grown. Each of the AlAs layer 124a and the GaAs layer 124b of the third layer 124 may have a thickness greater than or equal to 1 nm and less than or equal to 10 nm. The third layer 124 may be formed by alternately growing the AlAs layers 124a and the GaAs layers 124b to a thickness less than or equal to 10 nm on the upper surface of the second layer 122 by the MOCVD. The number of pairs of the GaAs layers 124b and AlAs layers 124a grown in this way may be about 1 to about 300, or about 5 to about 100, but is not limited thereto.

The third layer 124 having a superlattice structure may reduce a dislocation or a defect that may occur due to a difference in the lattice constant between the second layer 122 and the fourth layer 127.

When the fourth layer 127 is directly grown on the surface of the second layer 122 when there is a large difference between the lattice constant of the material constituting the second layer 122 (e.g., GaAs) and the lattice constant of the material constituting the fourth layer 127 (e.g., InP), a dislocation or a defect may occur at the interface between the second layer 122 and the fourth layer 127 due to a difference in the lattice constant.

In this example embodiment, the occurrence of the dislocation or the defect may be inhibited, by forming the third layer 124 of the superlattice structure between the second layer 122 and the fourth layer 127, and lattice matching between layers may be possible.

The fourth layer 127 may be formed by growing InP on the upper layer of the third layer 124 by, for example, the MOCVD. However, the fourth layer 127 is not limited to InP. The thickness of the fourth layer 127 may be greater than or equal to 0.5 μm and less than or equal to 20 μm, but is not limited thereto.

The fourth layer 127 may include a plurality of layers. The fourth layer 127 may include, for example, a low-temperature buffer material layer (a low-temperature InP layer) grown on the upper surface of the third layer 124 and a high-temperature buffer material layer (a high-temperature InP layer) grown on the upper surface of the low-temperature buffer material layer. The low-temperature buffer material layer may additionally inhibit the occurrence of the dislocation or the defect, and may be grown at a lower temperature than the high-temperature buffer material layer grown thereon.

For example, the low-temperature InP layer may be grown on the upper surface of the third layer 124 at, for example, approximately 600° C., and the high-temperature InP layer may be grown on the upper surface of the low-temperature InP layer at, for example, approximately 680° C. Such growth temperatures are examples and are not limited thereto.

The first type semiconductor layer 131, the first cladding layer 141, the light absorption layer 150, the second cladding layer 142, and the second type semiconductor layer 132 may be sequentially stacked on the multiple buffer layer 120. Each of the first type semiconductor layer 131, the first cladding layer 141, the light absorption layer 150, the second cladding layer 142, and the second type semiconductor layer 132 may be formed by, for example, the MOCVD. The first type semiconductor layer 131, the first cladding layer 141, the light absorption layer 150, the second cladding layer 142, and the second type semiconductor layer 132 formed on the multiple buffer layer 120 may form a p-i-n junction structure for light modulation. Here, the light absorption layer 150 is not doped with a dopant, and may form, that is, an intrinsic-region.

The first type semiconductor layer 131 may include InP. The first type semiconductor layer 131 may include a first type dopant, and for example, InP may be doped with an n type dopant. As the n type dopant, for example, silicon (Si), carbon (C), Ge, selenium (Se), or tellurium (Te) may be used. When the first type semiconductor layer 131 is p type, for example, Zn or Mg may be used as a p type dopant. The first type semiconductor layer 131 is not limited to n type InP, and may vary depending on the material of the fourth layer 127 of the multiple buffer layer 120. For example, the first type semiconductor layer 131 may include indium gallium arsenide (InGaAs), indium gallium aluminum arsenide (InGaAlAs), or InGaAsP.

A first type contact layer 161 may be formed on a partial region of the first type semiconductor layer 131. As shown in FIG. 1, a part of the upper surface of the first type semiconductor layer 131 may be exposed, and the first type contact layer 161 may be formed on the exposed upper surface of the first type semiconductor layer 131. The first type contact layer 161 may include the same material as the first type semiconductor layer 131, and the first type contact layer 161 may be doped with the n type dopant at a higher concentration than the first type semiconductor layer 131. An electrode may be further formed on the first type contact layer 161. According to another example embodiment, the first type contact layer 161 may include an electrode material, for example, a highly conductive metal or various conductive materials.

The first cladding layer 141 may be provided on the upper surface of the first type semiconductor layer 131. The first cladding layer 141 and the second cladding layer 142 to be described later may serve to confine light incident on the light absorption layer 150. The first and second cladding layers 141 and 142 may additionally spread a current.

The first cladding layer 141 may include, for example, a material including a certain dopant in at least one of indium (In), gallium (Ga), aluminum (Al), arsenic (As), phosphor (P,) Si, zinc (Zn), or C. The first cladding layer 141 may include InGaAs, InGaAlAs, InGaAsP, or a material including a certain dopant in InP. The first cladding layer 141 may have a lower dopant concentration than a dopant concentration of the first type semiconductor layer 131. The first cladding layer 141 may include InGaAsP similarly to the light absorption layer 150, and the contents of In, Ga, As, and P thereof may be adjusted to have higher bandgap energy than an energy bandgap of the light absorption layer 150. For example, the first cladding layer 141 may include $In_xGa_yAs_wP_z$ (x+y=z+w=1, 0.65≤x≤0.85, 0.4≤z≤0.6).

When the first type semiconductor layer 131 is an n type, the first cladding layer 141 may be an n type cladding layer. In this case, the first cladding layer 141 may include, for example, an n type dopant such as Si, C, Ge, Se, or Te. When the first type semiconductor layer 131 is a p type, the first cladding layer 141 may be a p type cladding layer. In this case, the first cladding layer 141 may include, for example, a p type dopant such as Zn or magnesium (Mg).

The light absorption layer 150 may be provided on the first cladding layer 141. The light absorption layer 150 may modulate the light in an infrared wavelength band by transmitting or absorbing the light in the infrared wavelength band. The wavelength band of the light modulated by the light absorption layer 150 may be determined according to the detailed material and the structure of the light absorption layer 150. For example, the light absorption layer 150 may modulate light in a wavelength range of about 1200 nm to about 2500 nm.

The light absorption layer 150 includes a multi-quantum well structure, that is, quantum barrier layers 151 and quantum well layers 152 which are alternately stacked a plurality of times. The quantum well layer 152 may include $In_xGa_yAs_wP_z$ (x+y=z+w=1, 0.4≤x≤0.6, 0.5≤z≤1.0), and the quantum barrier layer 151 may include $In_xGa_yAs_wP_z$ (x+y=z+w=1, 0.5≤x≤0.7, 0.5≤z≤0.8).

Each quantum well layer 152 may be formed to a thickness of, for example, about 1 nm to about 25 nm, and each quantum barrier layer 151 may be formed to a thickness of, for example, about 2 nm to about 50 nm. However, this is merely an example, and the quantum well layer 152 and the quantum barrier layer 151 may be formed in various thicknesses.

An absorption wavelength band may be adjusted by changing at least one of the shape, material, or thickness of the quantum well layer 152, and an absorption intensity may be adjusted by changing the number of layers of the quantum well layer 152.

The second cladding layer 142 may be provided on the upper surface of the light absorption layer 150. As described above, the first and second cladding layers 141 and 142 may serve to confine light absorbed by the light absorption layer 150 and may also serve to spread current.

The second cladding layer 142 may include, for example, a material including a certain dopant in at least one of In, Ga, Al, As, P, Si, Zn, or C. The second cladding layer 142 may include InGaAs, InGaAlAs, InGaAsP, or a material including a certain dopant in InP. The second cladding layer 142 may have a lower dopant concentration than a dopant concentration of the second type semiconductor layer 132. The second cladding layer 142 may include InGaAsP similarly to the light absorption layer 150, and the contents of In, Ga, As, and P thereof may be adjusted to have higher bandgap energy than an energy bandgap of the light absorption layer 150. For example, the second cladding layer 142 may include $In_xGa_yAs_wP_z$ (x+y=z+w=1, 0.65≤x≤0.85, 0.4≤z≤0.6).

When the second type semiconductor layer 132 is the n type, the second cladding layer 142 may be an n type cladding layer. In this case, the second cladding layer 142 may include, for example, an n type dopant such as Si, C, Ge, Se, or Te. When the second type semiconductor layer 132 is a p type, the second cladding layer 142 may be a p type cladding layer. In this case, the second cladding layer 142 may include, for example, a p type dopant such as Zn or Mg.

The second type semiconductor layer 132 may be provided on the upper surface of the second cladding layer 142.

The second type semiconductor layer 132 may include InP. The second type semiconductor layer 132 may include a second type dopant, and for example, InP may be doped with a p type dopant. As the p type dopant, for example, Zn or Mg may be used. The second type semiconductor layer 132 is not limited to the p type InP. For example, the second type semiconductor layer 132 may include InGaAs, InGaAlAs, or InGaAsP.

A second type contact layer 162 may be formed on the second type semiconductor layer 132. The second type contact layer 162 may include the same material as a material of the second type semiconductor layer 132, and the second type contact layer 162 may be doped with a p type dopant at a higher concentration than the second type semiconductor layer 132. An electrode may be further formed on the second type contact layer 162. According to another example embodiment, the second type contact layer 162 may include an electrode material, for example, a highly conductive metal or various conductive materials.

Figure 3:
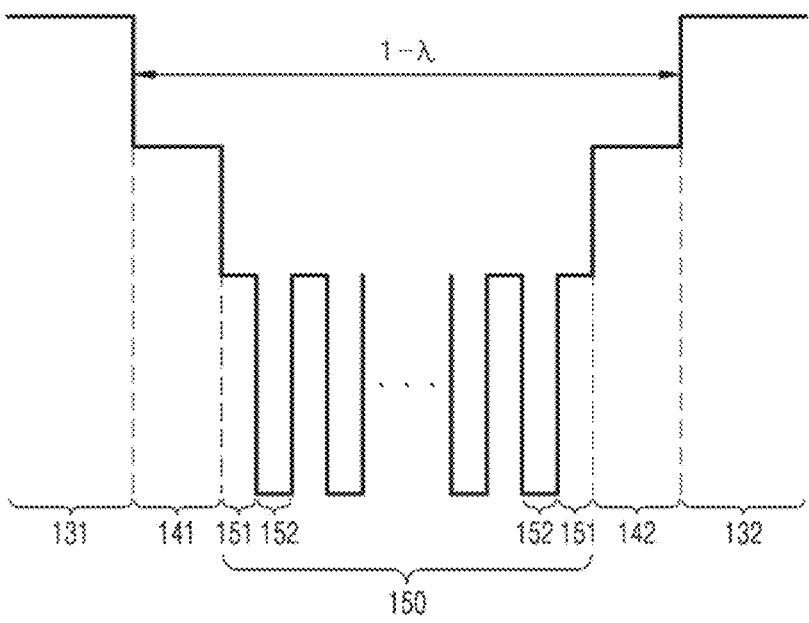
FIG. 3 is a diagram illustrating a relationship between bandgap energies of semiconductor layers included in the infrared modulator of FIG. 1.
Figure 4A:
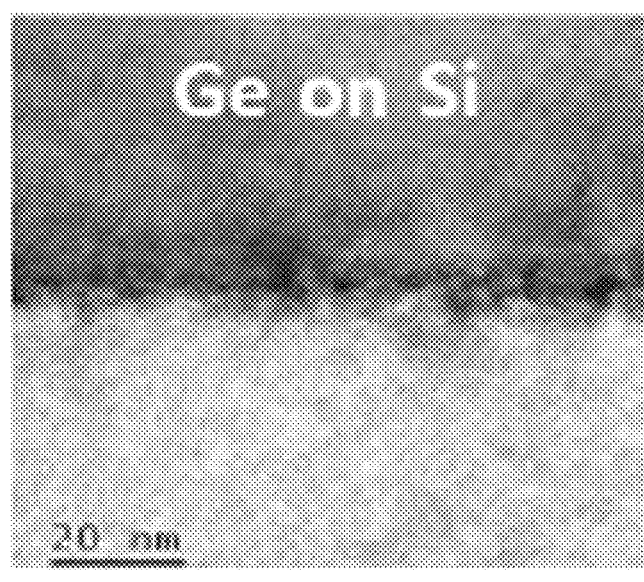
FIGS. 4A, 4B, 4C, and 4D are transmission electron micrographs showing lattice matching states between a plurality of semiconductor layers constituting the infrared modulator of FIG. 1.
Figure 4B:
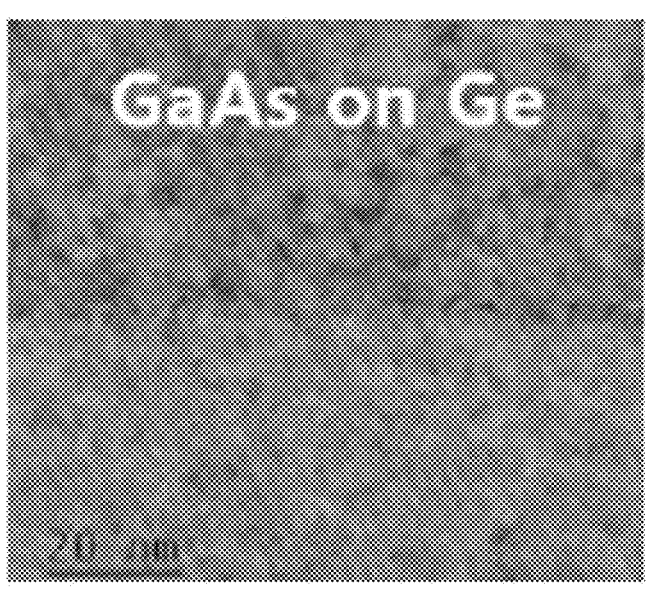
Figure 4C:
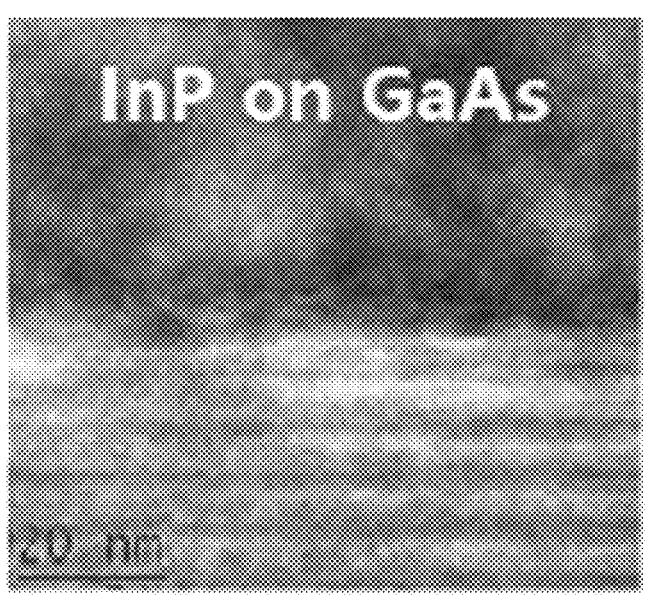
Figure 4D:
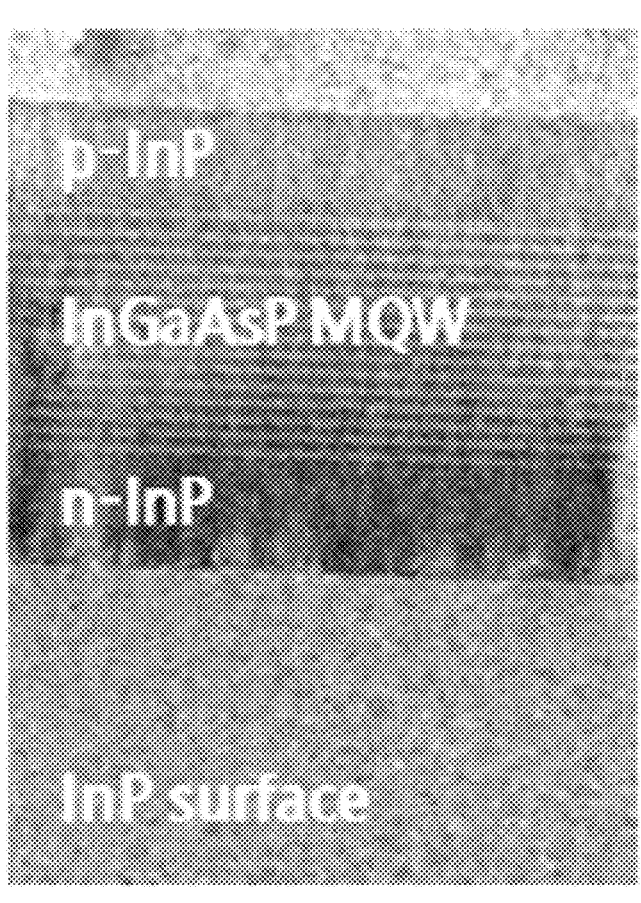

FIG. 3 is a diagram illustrating a relationship between bandgap energies of semiconductor layers included in the infrared modulator 100 of FIG. 1.

As described above, a modulation wavelength band may be determined by the detailed composition of the quantum well layer 152 and the quantum barrier layer 151 and the resulting bandgap energy. An optical thickness between the first type semiconductor layer 131 and the second type semiconductor layer 132 may be set in consideration of a target wavelength in an off state. The target wavelength is a wavelength of light to be transmitted by the infrared modulator 100 while no voltage is applied between the first type contact layer 161 and the second type contact layer 162.

FIGS. 4A to 4D are transmission electron micrographs (TEMs) showing lattice matching states between a plurality of semiconductor layers constituting the infrared modulator 100 of FIG. 1.

FIGS. 4A to 4D illustrate that that lattice matching is well made at the boundary of each layer.

Figure 5:
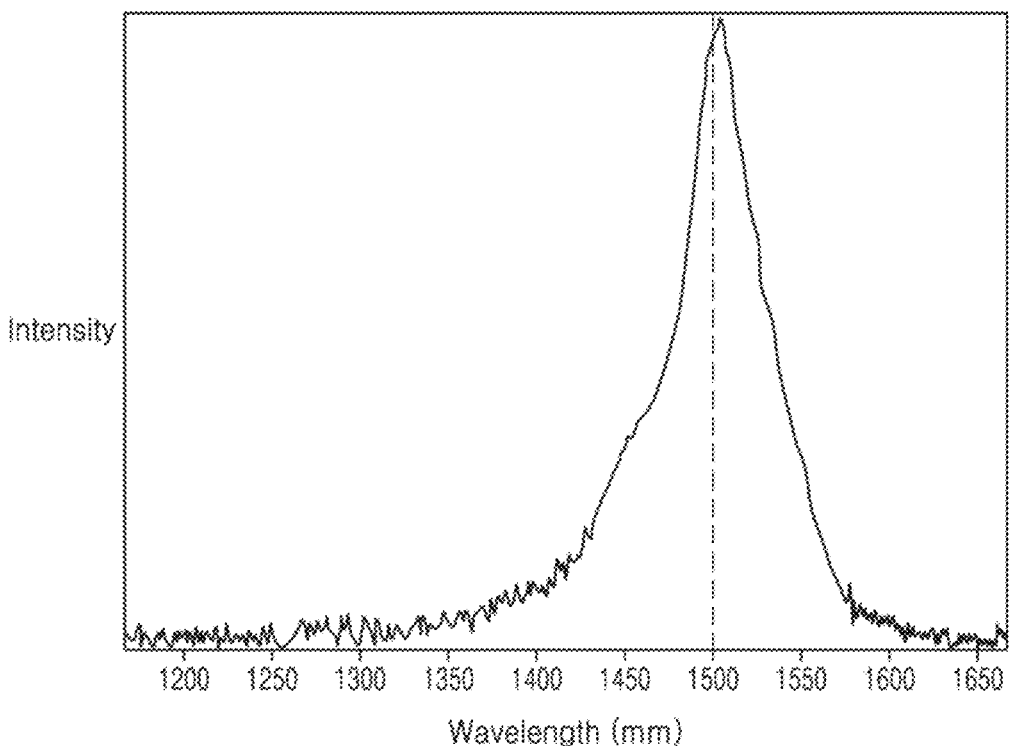
FIG. 5 shows a PL spectrum with respect to the infrared modulator of FIG. 1.

FIG. 5 shows a PL spectrum with respect to the infrared modulator 100 of FIG. 1.

In the PL spectrum, the peak of a transmission wavelength in an off state is 1503 nm, and a full width at half maximum (FWHM) thereof is 65 nm. The spectrum relates to results of designing and manufacturing the infrared modulator 100 in which a target wavelength is 1510 nm, a quantum well layer includes $In_{0.59}Ga_{0.41}As_{0.86}P_{0.14}$ with a thickness of 4 nm, a quantum barrier layer includes $In_{0.68}Ga_{0.32}As_{0.7}P_{0.3}$ with a thickness of 8 nm, the number of pairs of quantum well layers and quantum barrier layers is 15, and a cladding layer includes $In_{0.77}Ga_{0.23}As_{0.5}P_{0.5}$ with a thickness of 73 nm. The transmission wavelength when a voltage is applied is about 1550 nm. For example, it may be seen that the designed infrared modulator 100 may on/off modulate the light in the wavelength band of 1550 nm according to the applied voltage.

In addition, the performance of a sample of an infrared modulator of related example, in which the above-described light absorption layer of InGaAsP quantum well structure is manufactured on an InP substrate, and the performance of a sample of the light absorption layer of the InGaAsP quantum well structure after forming a multiple buffer layer on a silicon substrate as in the example embodiment are compared. It was confirmed that an extinction ratio (ER) indicating a ratio of voltage on/off is 9.6 dB in the sample of the example embodiment, which indicates a similar level of performance to 18.4 dB of the related example.

The above-described infrared modulator 100 may be employed in an optical computing structure for high speed and high efficiency computing, and may be utilized as, for example, a nonlinear optical device. Both a linear structure for calculation and a nonlinear structure for judgment are used in the optical computing structure. The linear structure may be directly implemented using various materials and structures on a silicon substrate, but currently, the nonlinear structure may be implemented by attaching a device thereto or connecting to an external electronic device because it cannot be directly implemented on the silicon substrate. For optical computing, a band of 1550 nm which is a wavelength at which optical loss is minimized is mainly used. The infrared modulator 100 of the example embodiment may modulate light in the wavelength band of 1550 nm and have a structure directly grown on the silicon substrate 110, and thus may be more easily applied as a nonlinear optical device to a silicon substrate-based optical computing structure.

Figure 6:
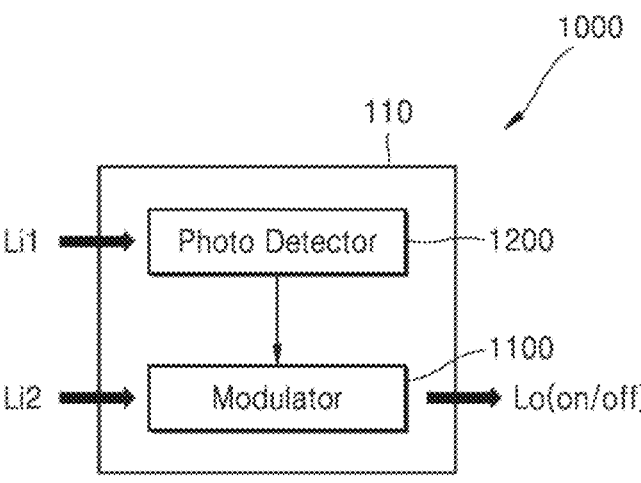
FIG. 6 is a block diagram showing a configuration of a nonlinear optical device according to an example embodiment.

FIG. 6 is a block diagram showing a configuration of a nonlinear optical device according to an example embodiment.

Referring to FIG. 6, a nonlinear optical device 1000 includes the silicon substrate 110, an infrared modulator 1100 formed on the silicon substrate 110, and a photodetector 1200 formed on the silicon substrate 110 and electrically connected to the infrared modulator 1100.

According to input lights Li1 and Li2 incident on the nonlinear optical device 1000, a certain output light Lo1 may be output. The output light Lo1 may be controlled to be on/off, or on/off may be defined according to the intensity of the output light Lo1. The input lights Li1 and Li2 may be infrared rays, for example, lights of a wavelength of 1550 nm. However, embodiments are not limited thereto. The input light Li1 may be incident on the photodetector 1200, and accordingly, an electrical signal may be generated in the photodetector 1200. An electrical signal generated by the photodetector 1200 in response to the input light Li1 is input to the infrared modulator 1100. The infrared modulator 1100 may modulate (on/off) the input light Li2 according to the applied voltage.

As described above, an electrical signal generated by the photodetector 1200 depends on the intensity of the input light Li1, and whether the input light Li2 is output from the infrared modulator 1100 depends on the electrical signal generated by the photodetector 1200, that is, a certain output signal Lo1 may be generated according to the input lights Li1 and Li2 input to the nonlinear optical device 1000.

The infrared modulator 1100 included in the nonlinear optical device 1000 may be substantially the same as the infrared modulator 100 described in FIG. 1. The photodetector 1200 provided in the nonlinear optical device 1000 may include photodetectors having various structures that absorb infrared rays and generate electrical signals.

Figure 7:
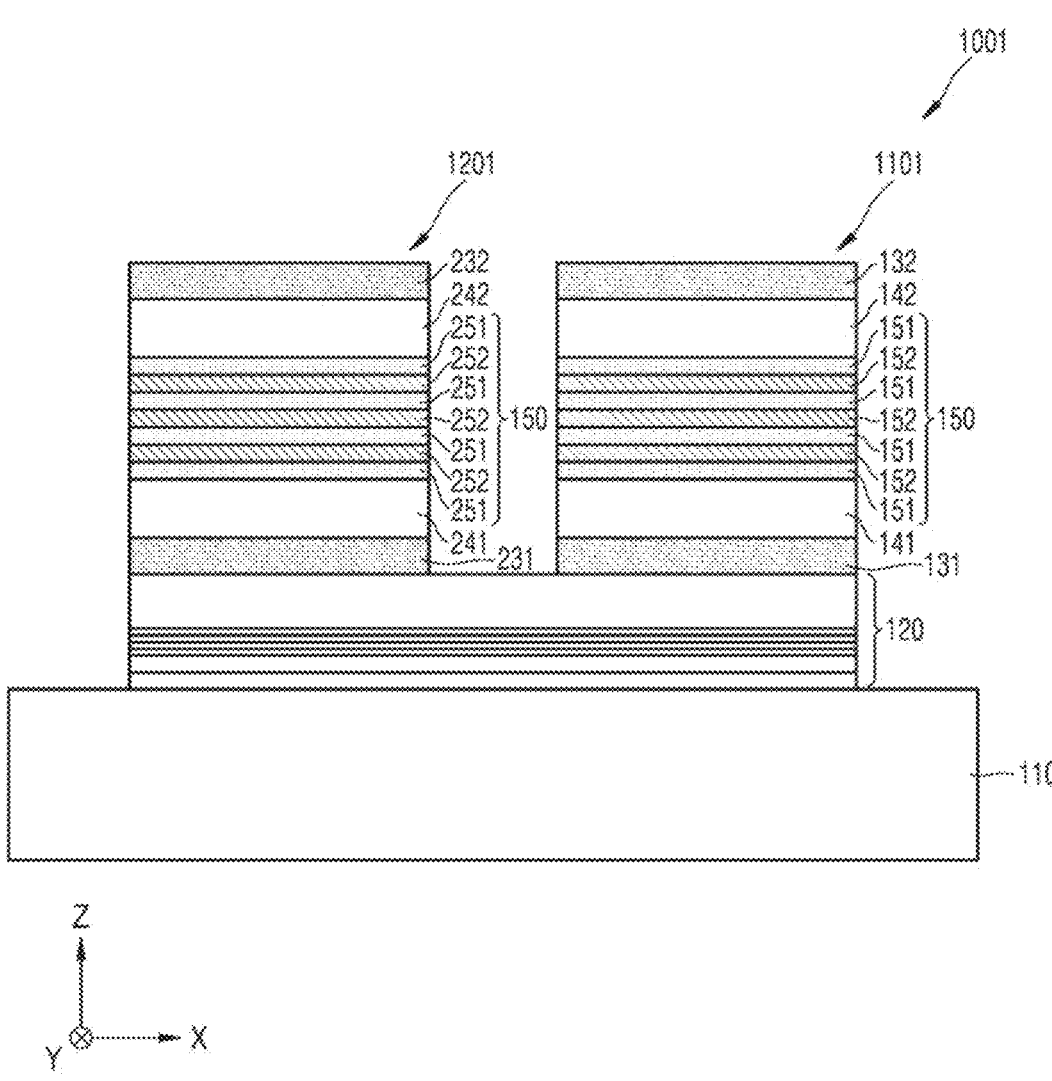
FIG. 7 is a cross-sectional view showing a detailed configuration of a nonlinear optical device according to an example embodiment.

FIG. 7 is a cross-sectional view showing a detailed configuration of a nonlinear optical device according to an example embodiment.

Referring to FIG. 7, a nonlinear optical device 1001 includes a photodetector 1201 and an infrared modulator 1101 formed on a silicon substrate 110. The infrared modulator 1101 may be substantially the same as the infrared modulator 100 described in FIG. 1. The photodetector 1201 may also have the same configuration as that of the infrared modulator 1101. For example, a p-i-n junction structure provided in the infrared modulator 1101 may be substantially the same as a p-i-n junction structure provided in the photodetector 1201. Similar to the infrared modulator 1101, the photodetector 1201 may include a first type semiconductor layer 231, a first cladding layer 241, a light absorption layer 250, a second cladding layer 242, and a second type semiconductor layer 232. The light absorption layer 250 may include a plurality of pairs of quantum well layers 252 and quantum barrier layers 251. The first type semiconductor layer 231, the first cladding layer 241, the light absorption layer 250, the second cladding layer 242, and the second type semiconductor layer 132 may be substantially the same as the first type semiconductor layer 131, the first cladding layer 141, the light absorption layer 150, the second cladding layer 142, and the second type semiconductor layer 132 included in the infrared modulator 1101, respectively. The photodetector 1201 may also share the multiple buffer layer 120 included in the infrared modulator 1101, for example, the first type semiconductor layer 231, the first cladding layer 241, the light absorption layer 250, the second cladding layer 242, and the second type semiconductor layer 232 may be sequentially formed on the multiple buffer layer 120.

A contact layer and electrodes described in FIG. 1 may be provided. The photodetector 1201 may also include a contact layer and electrodes. The electrodes included in the photodetector 1201 may include, for example, electrodes applying a reverse bias voltage for a photodetection operation and electrodes outputting an electrical signal according to photodetection. The nonlinear optical device 1001 may further include a circuit configuration applying an output electrical signal of the photodetector 1201 to the infrared modulator 1101 as a voltage.

Figure 8:
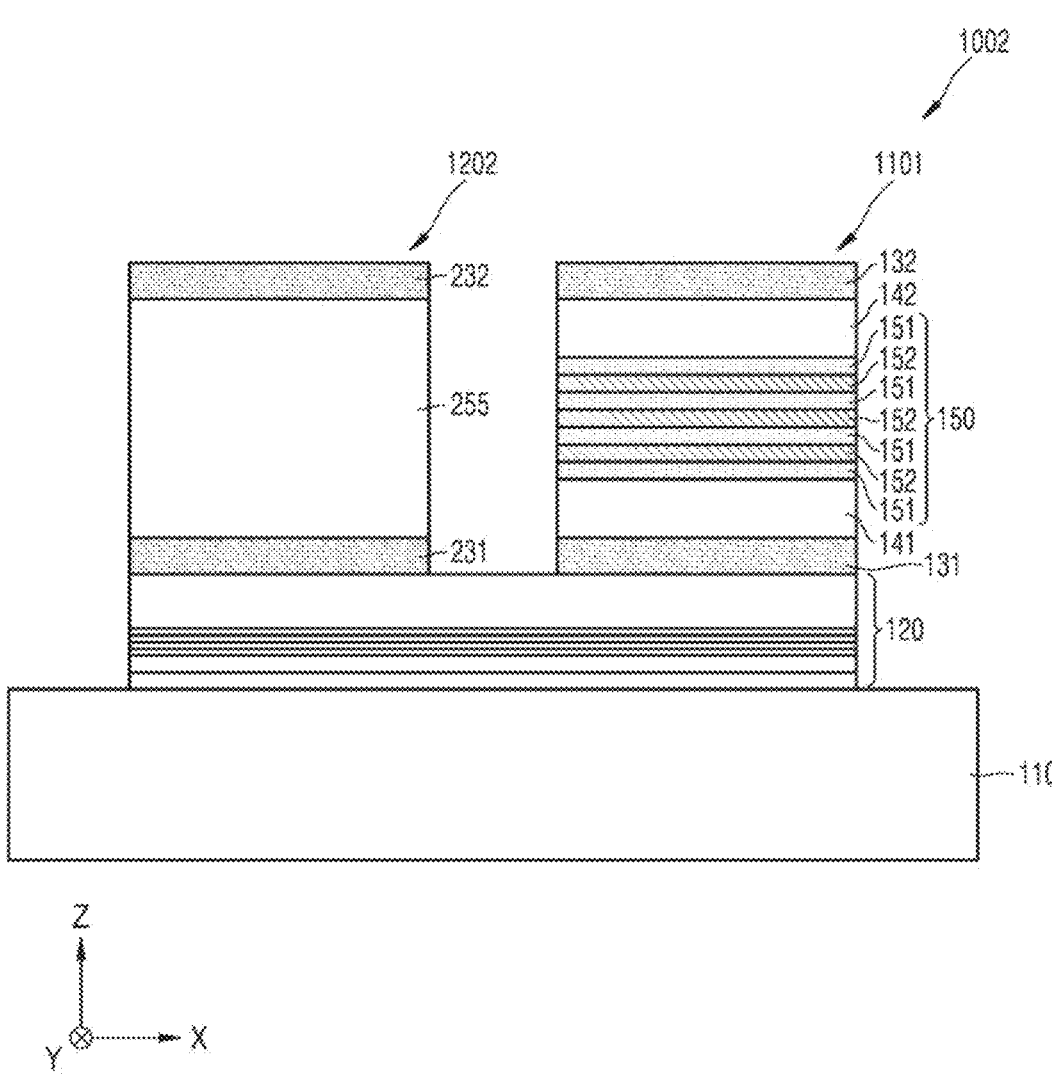
FIG. 8 is a cross-sectional view showing a detailed configuration of a nonlinear optical device according to another example embodiment.

FIG. 8 is a cross-sectional view showing a detailed configuration of a nonlinear optical device according to another example embodiment.

A nonlinear optical device 1002 includes a photodetector 1202 and an infrared modulator 1101 formed on the silicon substrate 110. The nonlinear optical device 1002 of the example embodiment is substantially the same as the nonlinear optical device 1001 of FIG. 7, except for the structure of a light absorption layer 255 of the photodetector 1202. The light absorption layer 255 of the photodetector 1202 may include GaAs. The light absorption layer 255 may include various materials such that the photodetector 1202 may detect light in an infrared wavelength band.

Figure 9:
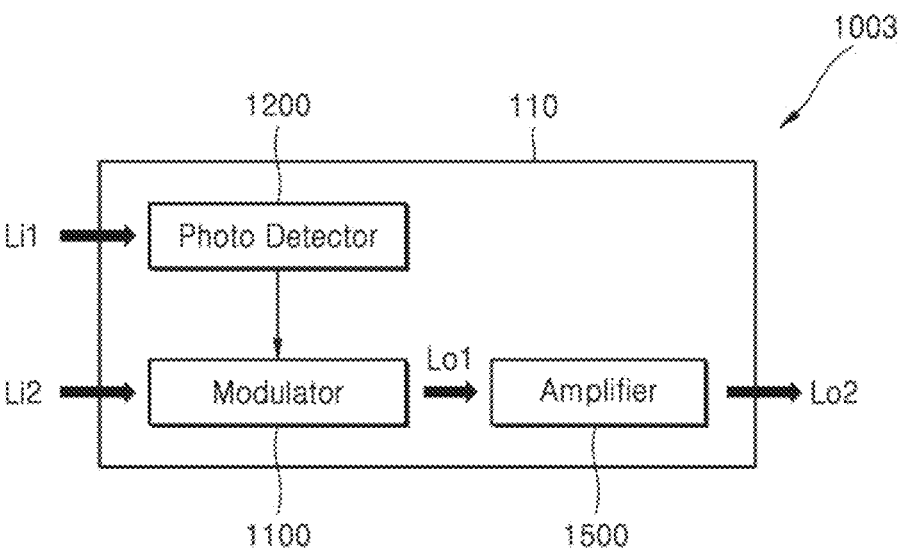
FIG. 9 is a block diagram showing a schematic configuration of a nonlinear optical device according to another example embodiment.

FIG. 9 is a block diagram showing a configuration of a nonlinear optical device according to another example embodiment.

Referring to FIG. 9, a nonlinear optical device 1004 may include the photodetector 1200, the infrared modulator 100, and an amplifier 1500 provided on the silicon substrate 110. The photodetector 1200 may include one of the photodetectors 1201 and 1202 illustrated in FIGS. 7 and 8. The infrared modulator 1100 may include the photodetector 1101 illustrated in FIGS. 7 and 8.

The amplifier 1500 may amplify the output light Lo1 of the infrared modulator 1100. The amplifier 1500 may include a gain medium, for example, a laser medium, and may output an amplified output light Lo2 when the output light Lo1 from the infrared modulator 1100 is incident.

Figure 10:
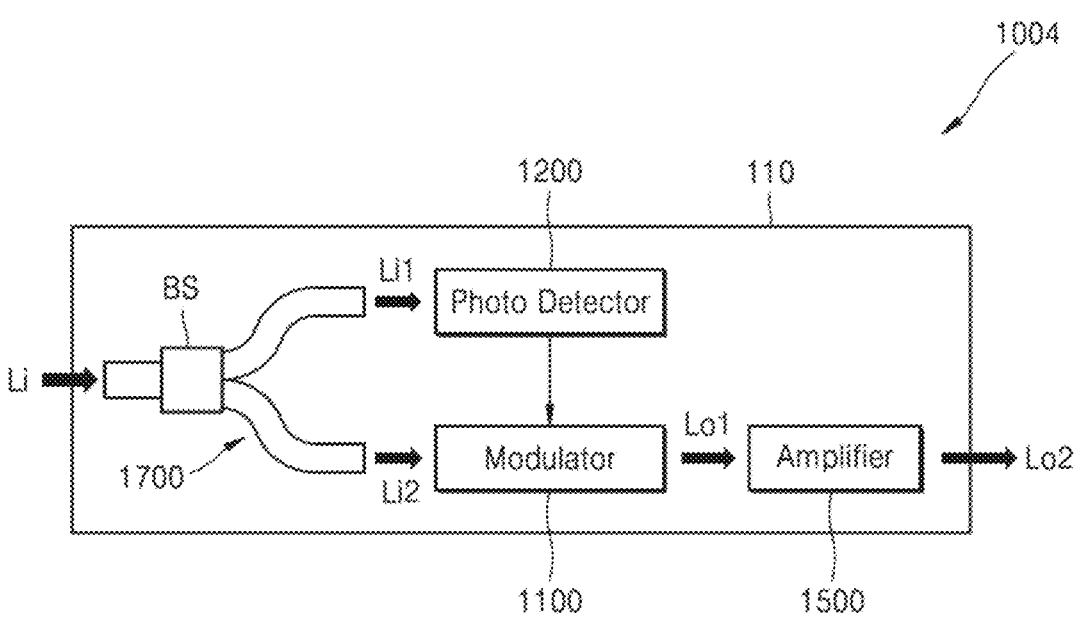
FIG. 10 is a block diagram showing a schematic configuration of a nonlinear optical device according to another example embodiment.

FIG. 10 is a block diagram showing a configuration of a nonlinear optical device according to another example embodiment.

Referring to FIG. 10, a nonlinear optical device 1004 may include an optical waveguide 1700, the photodetector 1200, the infrared modulator 100, and the amplifier 1500 provided on the silicon substrate 110.

The nonlinear optical device 1004 of the example embodiment is different from the nonlinear optical device 1003 of FIG. 9 in that the nonlinear optical device 1004 further includes an optical waveguide 1700. The optical waveguide 1700 may split the incident light Li into the input lights Li1 and Li2 and provide the input lights Li1 and Li2 to the photodetector 1200 and the infrared modulator 1100, respectively. The optical waveguide 1700 may include a beam splitter (BS) for optical splitting. The BS may split the incident light Li into two branches, and at this time, the split ratio may be the same or may be different.

Figure 11:
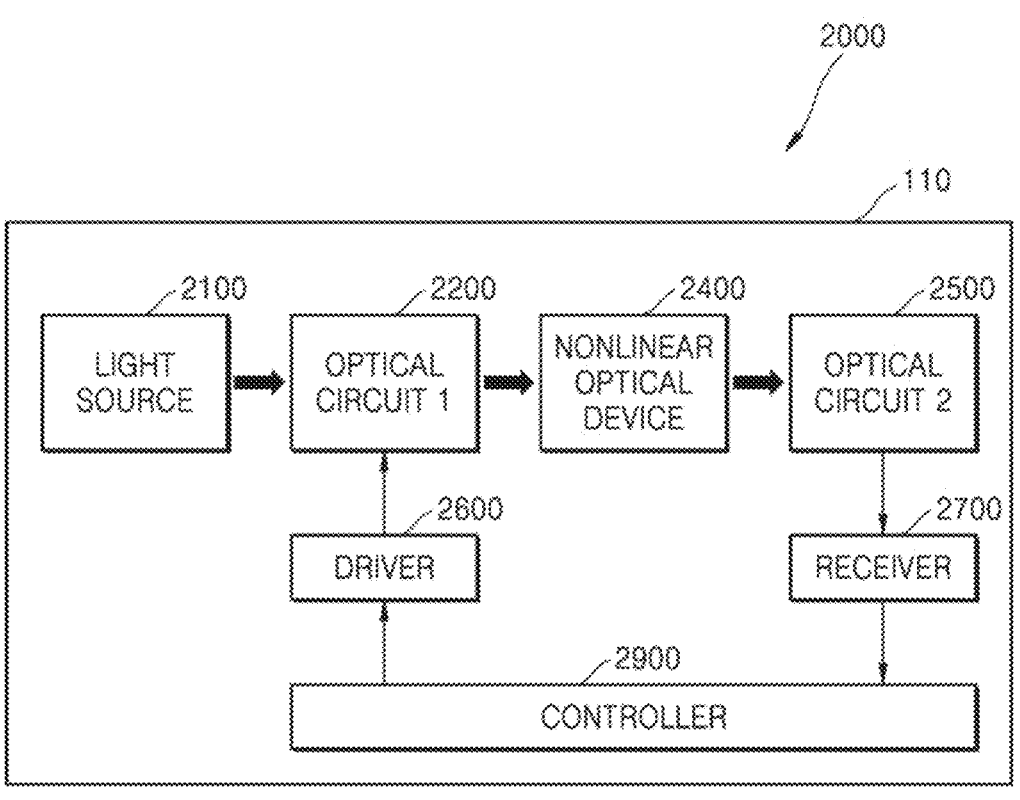
FIG. 11 is a block diagram showing a schematic configuration of an optical computing system according to an example embodiment.

FIG. 11 is a block diagram showing a configuration of an optical computing system according to an example embodiment.

An optical computing system 2000 may be part of, for example, an artificial intelligence (AI) accelerator.

The optical computing system 2000 includes a light source 2100, a nonlinear optical device 2400 that outputs a decision signal determined according to a type of light input from the light source 2100, and a controller 2900 that adjusts an input signal to the nonlinear optical device 2400 and processes an output from the nonlinear optical device 2400. The controller 2900 may include a computing device such as a workstation computer, a desktop computer, a laptop computer, or a tablet computer. The controller 2900 may include a simple controller, a microprocessor, a complex processor such as a central processing unit (CPU) or a graphics processing unit (GPU), a processor configured by software, or dedicated hardware or firmware. For example, the controller 2900 may be implemented by a general-use computer or an application-specific hardware component such as a digital signal processor (DSP), a field programmable gate array (FPGA), or an application-specific integrated circuit (ASIC).

The nonlinear optical device 2400 may include any one of the nonlinear optical devices 1000, 1001, 1002, 1003, and 1004 described with reference to FIGS. 7 to 9. The nonlinear optical device 2400 may include a plurality of arrays of such nonlinear optical devices.

The optical computing system 2000 may further include an optical circuit provided to be optically connected to an output terminal of the nonlinear optical device 2400 or an input terminal thereof. For example, an optical circuit 1 2200 may be provided between the light source 2100 and the nonlinear optical device 2400, and a driver 2600 may be controlled by the controller 2900 and may apply a control signal to the optical circuit 1 2200. In addition, an optical circuit 2 2500 may be provided at the output terminal of the nonlinear optical device 2400, and a signal of the optical circuit 2 2500 may be transmitted to the controller 2900 through a receiver 2700.

The light source 2100 may provide light in an infrared wavelength band. The light source 2100 may be, for example, a laser that emits light in a wavelength band of about 800 nm to about 1700 nm.

The optical circuit 1 2200 may have a configuration modulating and branching light from the light source 2100. For example, the optical circuit 1 2200 may include a configuration modulating and branching the light from the light source 2100 into light of the number and intensity required for the input of the nonlinear optical device 2400, and may include an optical waveguide structure including one or more beam splitters and one or more phase retarders.

The optical circuit 2 2500 may convert an output light emitted from the nonlinear optical device 2400 into an electrical signal. The optical circuit 2 2500 may amplify the output light emitted from the nonlinear optical device 2400 and convert the output light into the electrical signal.

The above-described infrared modulator has a structure based on a high quality thin film formed on a silicon substrate, thereby turning on/off light of a desired infrared wavelength band.

The above-described infrared modulator may form a silicon substrate-based nonlinear device together with a photodetector.

The above-described infrared modulator may be utilized in a silicon substrate-based optical computing system.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims and their equivalents.

What is claimed is:

1. An optical device comprising:
a silicon substrate;
an infrared modulator on the silicon substrate; and
a photodetector on the silicon substrate and electrically connected to the infrared modulator,
wherein the infrared modulator comprises:
    a multiple buffer layer on the silicon substrate, the multiple buffer layer comprising indium phosphide (InP);
    a first type semiconductor layer on the multiple buffer layer, the first type semiconductor layer comprising InP;
    a light absorption layer on the first type semiconductor layer, the light absorption layer comprising a quantum well structure comprising indium gallium arsenic phosphide (InGaAsP); and
    a second type semiconductor layer on the light absorption layer, the second type semiconductor layer comprising InP, and
wherein the photodetector comprises:
    the multiple buffer layer of the infrared modulator;
    a portion of the first type semiconductor layer;
    a portion of the second type semiconductor layer; and
    a second light absorption layer comprising GaAs, the second light absorption layer being continuously disposed between the first type semiconductor layer and the second type semiconductor layer.

2. The optical device of claim 1, wherein the multiple buffer layer comprises:
a first layer comprising germanium (Ge);
a second layer on the first layer, the second layer comprising gallium arsenide (GaAs);
a third layer on the second layer, the third layer comprising a superlattice structure comprising pairs of an aluminum arsenide (AlAs) layer and a GaAs layer that are stacked a plurality of times; and
a fourth layer on the third layer, the fourth layer comprising InP.

3. The optical device of claim 2, wherein a thickness of the first layer is greater than or equal to 0.1 μm and less than or equal to 5 μm.

4. The optical device of claim 2, wherein a thickness of the second layer is greater than or equal to 0.1 μm and less than or equal to 5 μm.

5. The optical device of claim 2, wherein each of the AlAs layer and the GaAs layer of the third layer has a thickness greater than or equal to 1 nm and less than or equal to 10 nm.

6. The optical device of claim 2, wherein a thickness of the fourth layer is greater than or equal to 0.5 μm and less than or equal to 20 μm.

7. The optical device of claim 1, further comprising:
a first cladding layer between the first type semiconductor layer and the light absorption layer, the first cladding layer comprising indium (In), gallium (Ga), arsenide (As), and phosphide (P), and a bandgap energy of the first cladding layer being greater than a bandgap energy of a quantum barrier layer; and
a second cladding layer between the light absorption layer and the second type semiconductor layer, the second cladding layer comprising In, Ga, As, and P, and a bandgap energy of the second cladding layer being greater than the bandgap energy of the quantum barrier layer.

8. The optical device of claim 7, wherein the quantum well structure comprises $In_xGa_yAs_wP_z$, where $x+y=z+w=1$, $0.4 \leq x \leq 0.6$, and $0.5 \leq z \leq 1.0$,
wherein the quantum barrier layer comprises $In_xGa_yAs_wP_z$, where $x+y=z+w=1$, $0.5 \leq x \leq 0.7$, and $0.5 \leq z \leq 0.8$, and
wherein each of the first cladding layer and the second cladding layer comprises $In_xGa_yAs_wP_z$, where $x+y=z+w=1$, $0.65 \leq x \leq 0.85$, and $0.4 \leq z \leq 0.6$.

9. The optical device of claim 1, wherein the light absorption layer is configured to transmit or absorb light having a wavelength of 1,550 nm, based on a voltage applied between the first type semiconductor layer and the second type semiconductor layer.

10. The optical device of claim 1, further comprising an amplifier on the silicon substrate, the amplifier being configured to amplify light transmitted through the infrared modulator.

11. The optical device of claim 1, further comprising an optical waveguide on the silicon substrate, the optical waveguide being configured to branch and guide an incident light to the photodetector and the infrared modulator.

12. An optical computing system comprising:
a light source;
an optical device configured to output a decision signal based on a type of a light input from the light source; and
a processor configured to adjust an input signal to the optical device and process an output from the optical device,
wherein the optical device comprises:
    a silicon substrate;
    an infrared modulator on the silicon substrate; and
    a photodetector on the silicon substrate, the photodetector being electrically connected to the infrared modulator, and
wherein the infrared modulator comprises:
    a multiple buffer layer comprising indium phosphide (InP);
    a first type semiconductor layer on the multiple buffer layer, the first type semiconductor layer comprising InP;
    a light absorption layer on the first type semiconductor layer, the light absorption layer comprising a quantum well structure comprising indium gallium arsenic phosphide (InGaAsP); and
    a second type semiconductor layer on the light absorption layer, the second type semiconductor layer comprising InP, and
wherein the photodetector comprises:
    the multiple buffer layer of the infrared modulator;
    a portion of the first type semiconductor layer;
    a portion of the second type semiconductor layer; and
    a second light absorption layer comprising GaAs, the second light absorption layer being continuously disposed between the first type semiconductor layer and the second type semiconductor layer.

13. The optical computing system of claim 12, wherein the photodetector comprises the multiple buffer layer of the infrared modulator.

14. The optical computing system of claim 12, further comprising at least one optical circuit on the silicon substrate and optically connected to an input terminal of the optical device or an output terminal of the optical device.

15. The optical computing system of claim 12, wherein the multiple buffer layer comprises:

a first layer comprising germanium (Ge);

a second layer on the first layer, the second layer comprising gallium arsenide (GaAs);

a third layer on the second layer, the third layer comprising a superlattice structure comprising pairs of an aluminum arsenide (AlAs) layer and a GaAs layer that are stacked a plurality of times; and a fourth layer on the third layer, the fourth layer comprising InP.

16. The optical computing system of claim 12, further comprising:

a first cladding layer between the first type semiconductor layer and the light absorption layer, the first cladding layer comprising indium (In), gallium (Ga), arsenide (As), and phosphide (P), and a bandgap energy of the first cladding layer being greater than a bandgap energy of a quantum barrier layer; and a second cladding layer between the light absorption layer and the second type semiconductor layer, the second cladding layer comprising In, Ga, As, and P, and a bandgap energy of the second cladding layer being greater than the bandgap energy of the quantum barrier layer.

* * * * *